March 31, 1959 J. M. KLEISER 2,879,855
THINNING IMPLEMENT FOR PLANT SEEDLINGS
Filed Sept. 6, 1955 2 Sheets-Sheet 1
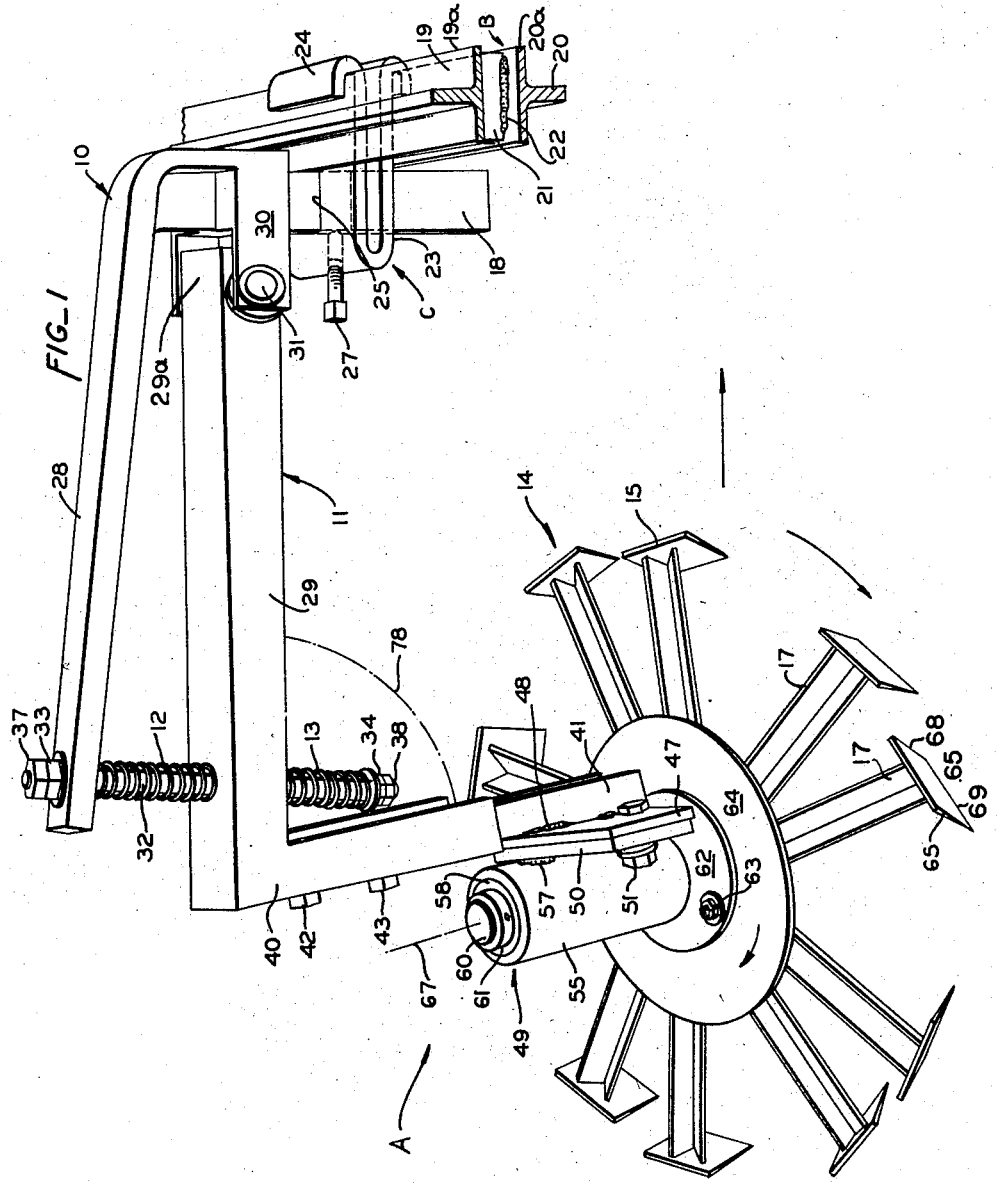
FIG_1
INVENTOR.
JAMES M. KLEISER
BY
Hansen and Lane
ATTORNEYS March 31, 1959 J. M. KLEISER 2,879,855
THINNING IMPLEMENT FOR PLANT SEEDLINGS
Filed Sept. 6, 1955 2 Sheets-Sheet 2
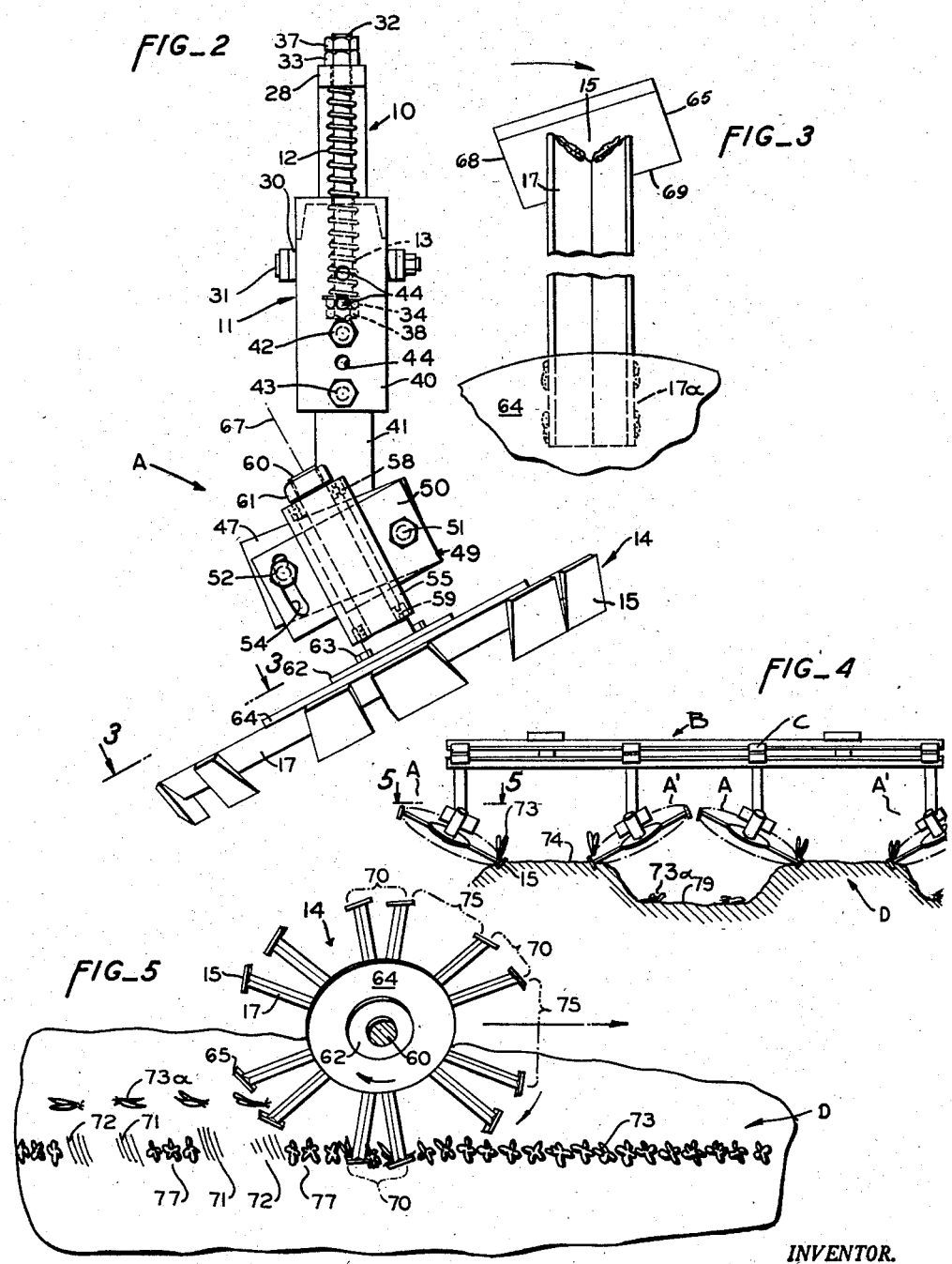
INVENTOR.
JAMES M. KLEISER
BY
Hansen and Lane
ATTORNEYS

United States Patent Office 2,879,855
Patented Mar. 31, 1959

2,879,855

THINNING IMPLEMENT FOR PLANT SEEDLINGS

James M. Kleiser, Hollister, Calif.

Application September 6, 1955, Serial No. 532,685

3 Claims. (Cl. 172—526)

The present invention relates to an agricultural implement, and pertains more particularly to a device for thinning out seedlings in row crops such as lettuce, beets, and carrots. The device also may be used for thinning other row crops, such as cotton.

Before planting row crops, the land is first carefully prepared, and where the crops are to be irrigated, the land also is accurately leveled. Usually row crops are planted, cultivated and otherwise treated four rows at a time, one row of the plants usually being provided along each side of a relatively wide topped hill, the processing in such case covering two hills at a time.

In order to permit planting and processing of the crops four rows at a time in this manner, it is essential that the hills be accurately formed, and also that the seeds be planted in accurately spaced rows along the edges of their respective hills.

Present day seeding equipment is very accurate, and it would be possible to plant the seed so that no thinning at all would be required were it not for the fact that the germination of the seed is not always accurately determinable. Therefore, it is preferred to plant the seeds along the rows in much greater numbers than will be required when the plants mature, and then to thin out the seedlings after they have come up.

The invention contemplates the provision of a simple, effective, auto-rotative plant thinning device which may be mounted on any conventional tractor, either singly or in suitable gang multiples, and drawn along rows of seedlings to accurately thin out the plants in the crop rows and to carry the removed plants laterally into the furrows between the hills.

Another object of the invention is to provide an auto-rotative plant thinning rotor resiliently mounted for easy vertical adjustment when encountering irregularities in the contour of a hill along which it is being drawn, the rotor being provided with radially extending arms, each arm having at its extremity a hoe-like cutting blade disposed at such an angle relative to the arm as to exert a lateral hoeing action on plants with which it is brought into engagement, the arms being so spaced angularly about the wheel axis that gaps will be provided between selected blades so as to exert a selective thinning action on seedlings in a plant row along which the device is drawn.

A further object of the invention is to provide an improved auto-rotative plant thinning agricultural implement which is spring mounted on an accurately positioned fixed support so as to act as its own gauge wheel.

These and other objects and advantages of the invention will be apparent from the following description and the accompanying drawings, wherein:

Fig. 1 is a perspective view of an illustrative form of plant thinning implement embodying the present invention as it appears when mounted on the draw-bar of a tractor.

Fig. 2 is an elevational view of the implement shown in Fig. 1 taken at right angles to the rotor axis.

Fig. 3 is an enlarged fragmentary plan view looking in the direction of the arrows 3—3 of Fig. 2 showing a radial blade support arm having a hoe-like blade mounted thereon, portions being broken away.

Fig. 4 is a diagrammatic sectional view taken through a pair of hills having rows of seedlings growing therein in the process of being operated upon by a four-gang assembly of implements of the type shown in Figs. 1 and 2.

Fig. 5 is a diagrammatic plan view in somewhat enlarged scale of one of the implements of Fig. 4 taken as along line 5—5 of Fig. 4.

Briefly describing the invention in general, a plant thinning implement A comprises a rigid mounting bracket 10 fixedly mounted in vertically adjusted position on a conventional tractor drawbar B. An angularly formed rotor support frame 11 is hingedly connected to the mounting bracket 10 and is resiliently supported in vertically adjusted position by springs 12 and 13.

A freely rotative plant thinning rotor 14 is mounted at an adjusted height and angle on the lower end of the angle frame 11. A hoe-like plant thinning blade 15 is mounted at a predetermined angle on the outer end of each of a plurality of radial arms 17 on the rotor 14 so that they will cut or chop into the ground of the crop rows at predetermined intervals to cut out unwanted seedlings and to deposit the removed seedlings in the furrows between the hills.

Describing more specifically the various parts of the implement A, the rigid mounting bracket 10 comprises an upright rectangular support bar portion 18 secured to the draw-bar B of a conventional tractor, not shown, by a conventional draw-bar clamp C.

The tractor draw-bar B consists of a pair of relatively inverted T-bars 19 and 20 connected in vertically spaced relation by a plurality of steel blocks 21 welded at 22 at spaced intervals therebetween.

The clamp C comprises a U-shaped body portion 23 inserted between the T-bars 19 and 20, and a reversely bent clip portion 24 on the free end of each leg of the U-shaped body portion 23 to grip the head portions 19a and 20a of the T-bars 19 and 20 respectively.

Aligned openings 25 are provided in the body 23 of the clamp C to receive the upright rectangular bar portion 18 of the rigid mounting bracket 10. A set screw 27 clamps the upright bar portion 18 securely against the draw bar B, and draws the reversely bent leg portions 24 of the clamp C tightly adjacent the rear edges of the draw bar.

A support arm portion 28 of the mounting bracket 10 is formed integrally with the upper end of the upright support bar 18, and projects therefrom at a slight upward angle to the horizontal.

The end 29a of the generally horizontal arm 29 of the resiliently supported angle rotor frame 11 is inserted between a pair of hinge bracket plates 30 provided one on each side of the upper end of the upright support bar portion 18. The angle rotor frame 11 is of channel steel stock, and a pivot bolt 31 hingedly connects the angle frame arm 29 to the hinge bracket plates 30.

A threaded rotor frame suspension rod 32 is inserted through a hole provided therefor near the free end of the rigid mounting bracket arm 28. This threaded rod 32 also passes through a hole provided therefor near the outer end of the generally horizontal arm 29 of the angle frame member 11.

The threaded rod 32 extends downwardly a substantial distance below the angle frame arm 29, and the coil springs 12 and 13 are mounted one above and one below the arm 29 to support it for resilient displacement when required.

Retaining nuts 33 and 34, screwed onto the ends of the threaded rod 32, hold the springs 12 and 13 in compression against the upper and lower sides, respectively of the horizontal angle frame arm 29. Turning either of the nuts 33 or 34 to shorten the distance therebetween tends to elevate the rear end of the angle frame arm 29 and to compress the springs 12 and 13, while turning either of these nuts to separate them has the reverse effect. Lock nuts 37 and 38 anchor the nuts 33 and 34, respectively, in adjusted position.

Fitted within the downwardly extending arm 40 of the angle frame 11 is mounted a channel extension member 41 which is secured in longitudinally adjusted position within the channel of the frame arm 40 by a pair of bolts 42 and 43. Alternate bolt receiving holes 44 (Fig. 2) are provided in the frame arm 40 for securing the extension 41 in selected vertically adjusted position within the channel arm 40.

A rotor mounting plate 47 is welded at 48 transversely across the lower end of the frame extension member 41. As shown in Fig. 2, the mounting plate 47 is tilted at a slight acute angle to the longitudinal center line of the extension member 41 to which it is secured.

A rotor bearing 49 comprising a plate portion 50 of substantially the same size as the mounting plate 47 is secured for lateral tiltable adjustment on the mounting plate 47 by bolts 51 and 52. One bolt 51 is inserted in registering holes (not shown) in the plates 47 and 50 to provide pivotal support for the tiltable bearing plate 50. The other bolt 52 is inserted through a hole (not shown) in the mounting plate 47, and also through an arcuate slot 54 provided in the tiltable bearing plate 50. The slot 54 is curved concentrically with the axis of the pivot bolt 51 so that the bearing plate 50 may be angularly adjusted about the bolt 51 as a pivot and may be secured in angularly adjusted position by tightening both bolts 51 and 52.

A bearing support sleeve 55 is welded at 57 to the angularly adjustable bearing plate 50, and a pair of conventional dust sealed ball bearings 58 and 59 are inserted one in each end of the sleeve.

A rotor spindle 60 is journaled for free rotation in the ball bearings 58 and 59, and is retained against axial displacement by a usual retaining collar 61 on the upper end of the spindle 60.

A disk portion 62 is formed co-axially on the lower end of the spindle 60, and to this disk portion is co-axially secured, by bolts 63, a rotor hub disk 64.

The blade support arms 17 are secured to the rotor hub disk 64 and extend substantially radially therefrom.

Each blade support arm 17 is of angle steel and is welded at 17a (broken lines Fig. 3) to the under side of the hub disk 64. Mounted transversely across the outer end of each radial blade support arm 17 is a hoe-like thinning blade 15. Each blade 15 is inclined slightly to a plane perpendicular to the longitudinal center line of its supporting arm 17 to offset the leading edge 65 (Fig. 3) of each blade in the direction of rotor rotation outwardly from the rotor axis 67 relative to its trailing edge 68. Each thinning blade 15 also is tilted so as to offset its lower or cutting edge 69 inwardly toward the rotor axis 67. The lower edge of each blade 15 is sharpened so as to cut easily into the ground D (Figs. 4 and 5) when brought into engagement therewith.

The radial arms 17 are spaced angularly in pairs 70 about the axis of the hub disk 64 upon which they are mounted, each pair 70 thereof being arranged closely enough together so that their blades 15 will cut closely adjacent grooves 71 and 72 when the device is drawn along a row 73 of seedlings with the implement A adjusted to contact the top of a hill 74 in which the seedlings are planted.

Adjacent pairs 70 of arms 17, however, are spaced apart by a greater angular distance 75 than that between the arms 17 of each pair 70 thereof, so that the space 75 between adjacent blade pairs 70 will leave a land 77 of desired width in which the seedlings are undisturbed.

Suitable angular spacings for the arms 17 for use in thinning lettuce, for example, is such that the two blades 15 of each pair 70 thereof will cut a double groove 71—72 (Fig. 5) of a total width of approximately eight inches (four inches for each blade) and will leave a land 71 between adjacent pairs of grooves of approximately four inches. Other spacing arrangements may be made as desired.

In using the device A the fixed mounting bracket 10 is mounted on the draw-bar B by suitable means such as the clamp C shown in Fig. 1.

The height of the mounting bracket 10 may be adjusted as required by loosening the set screw 27, moving the vertical bar portion 18 upwardly or downwardly in the body of the clamp as required, and again tightening the set screw. The height of the rotor 14 relative to the draw-bar B may be further adjusted by removing the bolts 42 and 43 in the extension member 41 and relocating them in other holes 44 in the upright frame arm with the extension member 41 adjusted at a desired height.

The angular position of the angle rotor support frame 11 about its pivot bolt 31 may be adjusted, as well as the stiffness of the springs 12 and 13, by tightening or loosening the nuts 33 and 34 on the threaded rod 32 as desired. Tightening the nuts shortens the springs and thereby increases their stiffness, and at the same time raises the free end of the angle frame 11. Separating the nuts reverses these effects.

The angle of adjustment of the angle frame 11 and the degree of compression of the springs 12 and 13 thus may be varied to suit the conditions under which the implement is being worked. For harder ground a stiffer spring action is desired and a more upright position of the channel arm 40 of the angle frame member 11, while for softer ground a softer spring action and a greater angle of tilt of the channel arm 40 is preferred. This adjustment, as well as other adjustments of the device, will be easily learned after the device has been used a few times so that operator may judge the setting required by the condition of the ground to be worked.

The angle of lateral tilt of the rotor spindle 60 may be adjusted by loosening the bolts 51 and 52 which secure the bearing plate portion 50 to the angular mounting plate 47 on the channel extension member 41, tilting the bearing plate 50 about the bolt 51 as a pivot, and securing the parts in adjusted position by tightening the bolts 51 and 52.

For harder ground it is preferred to have a lesser angle of lateral tilt to the rotor spindle 60, a more upright position of the angle frame arm 40, and a stiffer action of the springs 12 and 13. This adjusted condition positions the blades 15 more nearly upright, and the stiffer spring action facilitates their entry into the ground.

For softer ground the angle of lateral tilt of the rotor spindle 60 is increased and the nuts 33 and 34 are separated so that the blades 15 will rest more nearly flat on the ground and the reduced spring pressure will not cause them to dig in too deeply. These adjustments also will soon be learned by observation and use.

The angle 78 between the arms 29 and 40 of the angle frame 11 is less than a right angle. Thus, when the arm 29 is horizontal, or tilted slightly downwardly toward its rear or free end 29a, the rotor spindle 60, which is in a plane substantially parallel to the upright arm portion 40, will be tilted slightly rearwardly, as will be noted in Fig. 1. This rearward tilt of the spindle 60, together with the transverse tilt of the spindle mentioned previously herein, causes each hoe-like blade 15 to engage the ground at a point approximately laterally of the rotor spindle 60 and then to swing downwardly and laterally toward a point directly rearwardly of the rotor axis. Each blade 15 thus cuts an arcuate groove 71 in the hill 74 and removes the dirt and seedlings therefrom, as best shown in Figs. 4 and 5. The removed dirt and seedlings are carried laterally off the hill in which they are growing into the furrow 79 by this hoe-like action of the blades.

As shown in Fig. 4, when using the implement A in gangs where one implement is employed for each of the two plant rows 73 on a hill 74, the two rotors A and A' for each hill will be tilted in opposite directions laterally outwardly away from the hill upon which they are operating, but the planes of rotation of both rotors will be tilted slightly rearwardly relative to the direction of tractor movement along the row. The necessary reversal of the mounting angles of the plates 47 and 50, and of the blades 15 on the arms 17 will be apparent to those familiar with the art and need not be illustrated or described in further detail.

By use of the present invention the unwanted seedlings 73a are cleanly chopped out of their rows 73, and are deposited in the furrows 79.

The thinning implement A of the present invention requires no positive driven connection with the tractor or other rotative driving mechanism since it is fully auto-rotative. It also requires no independent gauging wheel, since it acts as its own gauging wheel in compensating for any unevenness or inequalities in the ground. The springs 12 and 13 allow the angle frame 11 and the rotor 14 carried thereby to ride up or down as required to follow the contours of the ground over which it is drawn.

The invention provides for a very substantial saving in plant thinning costs, since operation of the invention requires a minimum amount of manual labor, such labor recently having become increasingly more expensive and difficult to obtain with each passing year.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. An auto-rotative plant thinning implement for drawing lengthwise along a hill having a row of seedlings planted therein, said implement comprising a rotor including a rotor hub, a rotor spindle secured coaxially to the upper side of said hub, a bearing mounting said spindle for free rotation therein, means for connecting the bearing to a supporting vehicle with the spindle axis inclined slightly from the vertical with its upper end tilted laterally and rearwardly relative to the predetermined direction of rotor travel, thereby to tilt the plane of hub rotation at a small acute angle from the horizontal downwardly toward one side thereof and with the forward end thereof inclined upwardly, a plurality of radially extending rotor arms mounted on said hub to rotate in the plane of hub rotation, a hoe-like rotor chopping blade of predetermined length mounted transversely across the radially outer end of each rotor arm, each blade being disposed at a slight acute angle to its arm with the leading edge of each blade disposed radially outwardly of its trailing edge, and with its lower edge sharpened and offset inwardly from its upper edge, whereby, when the implement is drawn along a hill having a row of seedlings planted therein at a height to have only the blades in the lower rear quarter of the rotor engage such hill, the lower edge of each blade in the lower rear quadrant of the rotor enters the hill along which the implement is being drawn at one side of a row of seedlings in such hill, and generally lengthwise of such hill, and is drawn transversely across the row of seedlings in a lateral hoe-like stroke, thereby removing the seedlings in its path and moving them transversely out of the row of seedlings toward a side of the hill, the drag of the blades on said lower rear quadrant acting to rotate the rotor.

2. An auto-rotative plant thinning implement for drawing lengthwise along a hill having a row of seedlings planted therein, said implement comprising a rotor, means for connecting the rotor to a supporting vehicle for free relative rotation about an axis, the plane of rotor rotation being inclined at a small acute angle from the horizontal downwardly toward one side thereof and with the forward end thereof inclined upwardly, a plurality of hoe-like chopping blades of predetermined length mounted at predetermined spaced intervals peripherally around the rotor, each blade being disposed at a slight acute angle to a radius from the axis of rotor rotation, and with the leading edge of each blade disposed radially outwardly of its trailing edge, whereby, when the implement is drawn along a hill having a row of seedlings planted therein at a height to have only the blades in the lower rear quadrant of the rotor engage such hill, the lower edge of each blade in the lower rear quadrant of the rotor enters the hill along which the implement is being drawn at one side of a row of seedlings in such hill, and generally lengthwise of such hill, and is drawn transversely across the row of seedlings in a lateral hoe-like stroke, thereby removing the seedlings in its path and moving them transversely out of the row of seedlings toward a side of the hill, the drag of the blades on such lower rear quadrant acting to rotate the rotor.

3. An arrangement according to claim 2 wherein the blades are arranged in pairs, and the blades of each pair overlap each other in their strokes across a row of seedlings, and adjacent pairs of blades are spaced apart circumferentially of the rotor so that the strokes of each pair of blades across a row of seedlings remove the seedlings within the combined width of their strokes, and are spaced from the strokes of the next adjacent preceding and succeeding pairs of blades sufficiently to leave undisturbed therebetween a selected width of seedling bearing ground.

References Cited in the file of this patent

UNITED STATES PATENTS

| | | |
|---|---|---|
| 679,090 | Parmiter | July 23, 1901 |
| 1,021,228 | Ayers | Mar. 26, 1912 |
| 2,581,642 | Forney | Jan. 8, 1952 |
| 2,689,511 | Begeman et al. | Sept. 21, 1954 |
| 2,699,023 | Caldwell | Jan. 11, 1955 |
| 2,737,866 | Bowen et al. | Mar. 13, 1956 |